United States Patent

[11] 3,617,490

| | | | |
|---|---|---|---|
| [72] | Inventor | Sigmund M. Csicsery | |
| | | Lafayette, Calif. | |
| [21] | Appl. No. | 839,999 | |
| [22] | Filed | July 8, 1969 | |
| [45] | Patented | Nov. 2, 1971 | |
| [73] | Assignee | Chevron Research Company | |
| | | San Francisco, Calif. | |

[54] HYDROCRACKING CATALYST COMPRISING A LAYERED CLAY-TYPE CRYSTALLINE ALUMINOSILICATE COMPONENT, A GROUP VIII COMPONENT, AND A CHROMIUM OR TUNGSTEN COMPONENT, AND PROCESS USING SAID CATALYST
19 Claims, 2 Drawing Figs.

[52] U.S. Cl............................................... 208/60,
208/59, 208/111, 252/455 Z
[51] Int. Cl................................................. C01b 33/28,
C10g 13/04, C10g 37/00
[50] Field of Search......................................... 208/120,
60, 455 Z

[56] References Cited
UNITED STATES PATENTS

| | | | | |
|---|---|---|---|---|
| 3,184,404 | 5/1965 | Flinn et al.................... | | 208/112 |
| 3,132,087 | 5/1964 | Kelley et al.................. | | 208/67 |
| 3,140,253 | 7/1964 | Plank et al................... | | 208/120 |
| 3,236,761 | 2/1966 | Rabo et al.................... | | 208/111 |
| 3,252,757 | 5/1966 | Granguist..................... | | 23/111 |
| 3,271,418 | 9/1966 | Plank et al................... | | 208/120 |
| 3,410,787 | 11/1968 | Kubicek........................ | | 208/57 |

Primary Examiner—Delbert E. Gantz
Assistant Examiner—G. E. Schmitkons
Attorneys—A. L. Snow, F. E. Johnston, C. J. Tonkin and Roy H. Davies ABSTRACT: A hydrocracking catalyst comprising a layered clay-type crystalline aluminosilicate cracking component, 0.01 to 2.0 weight percent, based on said cracking component and calculated as the metal, of a hydrogenating component selected from platinum and compounds thereof, palladium and compounds thereof, rhodium and compounds thereof, ruthenium and compounds thereof, and iridium and compounds thereof, and 0.01 to 5.0 weight percent, based on said cracking component and calculated as the metal, of a hydrogenating component selected from the group consisting of chromium and compounds thereof and tungsten and compounds thereof, and processes using said catalyst.

INVENTOR
SIGMUND M. CSICSERY
BY Roy H. Davies
C J Tonkin
ATTORNEYS

HYDROCRACKING CATALYST COMPRISING A LAYERED CLAY-TYPE CRYSTALLINE ALUMINOSILICATE COMPONENT, A GROUP VIII COMPONENT, AND A CHROMIUM OR TUNGSTEN COMPONENT, AND PROCESS USING SAID CATALYST

INTRODUCTION

This invention relates to catalytic hydrocracking of hydrocarbons, including petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al., U.S. Pat. No. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known, particularly from Granquist U.S. Pat. No. 3,252,757, that a relatively new layered crystalline aluminosilicate mineral that has been synthesized has the empirical formula $$nSiO_2:Al_2O_3:mAB:xH_2O,$$

where the layer lattices comprise said silica, said alumina, and said B, and where
$n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, 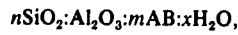 and mixtures thereof, and is internal in the lattice, and
$x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. Upon drying and calcination whereby all or substantially all of the water is removed, said $d_{001}$ spacing changes because of structural contraction of the mineral. The equivalent of an exchangeable cation, A, in said catalyst may be chosen from the group consisting of $H^+$, $NH_4^+$, $Na^+Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said synthetic aluminosilicate mineral is a layered clay-type crystalline aluminosilicate, which term as used herein is intended to include dehydrated forms of said synthetic mineral, similar synthetic minerals, and corresponding identical and similar natural minerals.

Said aluminosilicate mineral, in the dehydrated form, is known from U.S. Pat. No. 3,252,889 to have application as a component of a catalytic cracking catalyst; however, applications of said mineral as a component of a hydrocracking catalyst have not been disclosed heretofore, except in other patent applications of the assignee of the present application.

OBJECTS

In view of the foregoing, objects of the present invention include providing a novel catalyst useful for hydrocracking, and a novel hydrocracking process using said catalyst, said catalyst:

1. Having a cracking component less sensitive to nitrogen poisoning than silica-alumina gel;
2. Having a cracking component that is crystalline in structure, having pores elongated in two directions, contrary to the pores of crystalline zeolitic molecular sieves, and therefore having less reactant access limitations than the pores of such molecular sieves;
3. Having a first hydrogenating component providing increased activity and stability to said catalyst, compared with a similar catalyst not containing said component;
4. Having a second hydrogenating component providing additional stability to said catalyst, compared with the same catalyst which contains said first hydrogenating component but not said second hydrogenating component.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

STATEMENT OF INVENTION

Figure 1:
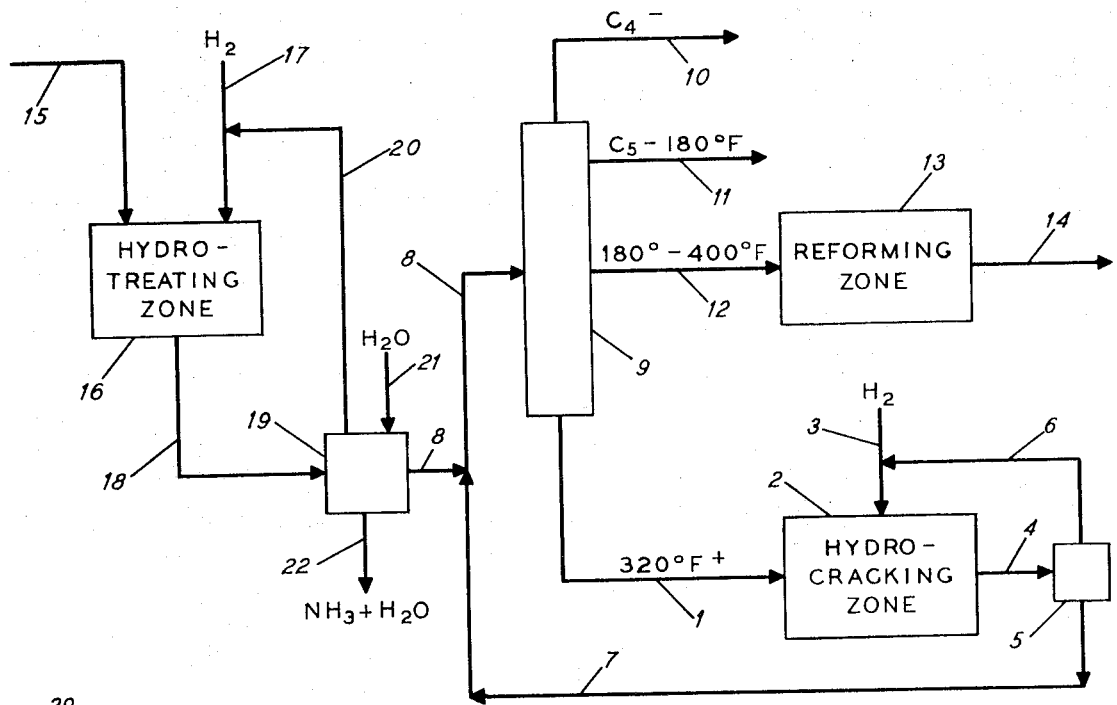
FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed.

It has been found that a catalyst comprising a layered clay-type crystalline aluminosilicate cracking component, for example the layered synthetic clay-type crystalline aluminosilicate mineral of Granquist U.S. Pat. No. 3,252,757, in dehydrated form, a hydrogenating component selected from platinum and compounds thereof, palladium and compounds thereof, rhodium and compounds thereof, ruthenium and compounds thereof, and iridium and compounds thereof, in an amount of 0.01 to 2.0 weight percent, calculated as metal, and 0.01 to 5.0 weight percent, calculated as metal and based on said cracking component, of a hydrogenating component selected from the group consisting of chromium and compounds thereof and tungsten and compounds thereof, has all of the desirable catalyst attributes listed under OBJECTS above, and, therefore, in accordance with the present invention there is provided such a catalyst and a hydrocracking process using such a catalyst. It has been found that the catalyst of the present invention surprisingly provides advantages over the Rabo et al., platinum or palladium on molecular sieve hydrocracking catalyst, while unexpectedly being free from disadvantages that the art would lead one to expect. In particular, in the catalyst of the present invention: (1) the presence of the chromium or tungsten component results in a catalyst of higher stability than a catalyst that is identical, except that contains no such component; and (2)

the presence of the component selected from platinum and compounds thereof, palladium and compounds thereof, iridium and compounds thereof, rhodium and compounds thereof and ruthenium and compounds thereof results in a catalyst of higher activity and stability than a catalyst that is identical except that contains no such Group VIII component.

In accordance with the present invention, therefore, there is provided a hydrocracking catalyst comprising a layered, clay-type crystalline aluminosilicate cracking component, 0.01 to 2.0 weight percent, based on said cracking component and calculated as the metal, of a hydrogenating component selected from platinum and compounds thereof, palladium and compounds thereof, iridium and compounds thereof, rhodium and compounds thereof and ruthenium and compounds thereof, and 0.01 to 5.0 weight percent, based on said cracking component and calculated as the metal, of a hydrogenating component selected from chromium and compounds thereof and tungsten and compound thereof, said cracking component having, prior to drying and calcining of said catalyst, the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ 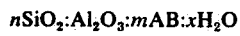 and mixtures thereof, and is internal in the lattice, and $x$ is from 2.0 to 3.5 at 50 percent relative humidity, said mineral being characterized by a $d^{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

Further in accordance with the present invention there is provided a catalyst effective for various hydrocarbon conversion reactions, including hydrocracking, hydrodesulfurization, hydrodenitrification, hydrogenation and hydroisomerization, comprising:

A. a dehydrated layer-type, crystalline, claylike mineral cracking component which prior to dehydration has the empirical formula $$n\text{SiO}_2:\text{Al}_2\text{O}_3:m\text{AB}:x\text{H}_2\text{O},$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$  and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and B. A hydrogenating component selected from platinum and compounds thereof, palladium and compounds thereof, rhodium and compounds thereof, ruthenium and compounds thereof, and iridium and compounds thereof, in an amount of 0.01 to 2.0 weight percent, based on said cracking component and calculated as metal, and a hydrogenating component selected from chromium and compounds thereof and tungsten and compounds thereof, in an amount of 0.01 to 5.0 weight percent, based on said cracking component and calculated as metal.

Said cracking component may be present in said catalyst in an amount of 10 to 99.9 weight percent, based on the total catalyst. If desired, said catalyst may further comprise a crystalline zeolitic molecular sieve cracking component in the amount of 1 to 50 weight percent, based on the total catalyst. The equivalent of an exchangeable cation, A, in said catalyst may be chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said catalyst additionally may comprise a component selected from the group consisting of alumina and silica-alumina. When the catalyst comprises alumina or silica-alumina, titania advantageously may be present also. When said catalyst comprises said additional component, preferably the catalyst is prepared by coprecipitation of all noncrystalline components to form a slurry, followed by addition of the layered clay-type crystalline aluminosilicate component (and additionally a crystalline zeolitic molecular sieve component, if desired) to the slurry in particulate form, followed by filtering, washing and drying to produce a hydrogel matrix having said crystalline component (or components) dispersed therethrough. Preferably in the finished catalyst said crystalline component (or components) will be in the ammonia or hydrogen form, and will contain substantially all of the required hydrogenating metals. This result will be obtained if said crystalline component (or components), loaded with the hydrogenating metals required in the catalyst of the present invention, is added to the slurry of other catalyst components at a PH of 5 or above. Alternatively, said crystalline component substantially in the hydrogen or ammonia form and substantially free of all catalytic loading metals (containing less than 0.2 weight percent of catalytic metal or metals) may be contained in the finished catalyst. This result will be obtained if the crystalline component, in the ammonia, hydrogen or sodium form, is added to the slurry of other catalytic components, including the hydrogenating metals required in the catalyst of the present invention, at a pH of 5 or above.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst comprising a layered clay-type crystalline aluminosilicate at hydrocracking conditions including a temperature in the range 400° to 950° F., a pressure in the range 800 to 3,500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrogen feedstock preferably contains less than 1,000 p.p.m. organic nitrogen. A prior hydrofining step may be used, if desired, to reduce the feed nitrogen content to the preferred level; however, because of the superior nitrogen tolerance of the layered clay-type crystalline aluminosilicate component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst comprising a layered clay-type crystalline aluminosilicate, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a layered clay-type crystalline aluminosilicate cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being said catalyst comprising a layered clay-type crystalline aluminosilicate, maintaining said first bed of catalyst and said second bed of catalyst at a temperature in the range 400° to 950° F. and a pressure in the range 800 to 3,500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst comprising a layered clay-type crystalline aluminosilicate in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing said catalyst comprising a layered clay-type crystalline aluminosilicate.

NITROGEN CONTENT OF FEEDSTOCKS

While the process of the present invention can be practiced with utility when supplying to the hydrocracking zone containing a catalyst comprising a layered clay-type crystalline aluminosilicate, hydrocarbon feeds containing relatively large quantities of organic nitrogen, for example several thousand parts per million organic nitrogen, it is preferred that the organic nitrogen content be less than 1,000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking.

Because of the superior tolerance of the layered clay-type crystalline aluminosilicate component for organic nitrogen compounds, compared with silica-alumina, the hydrofining step need not accomplish complete organic nitrogen content reduction. Further, because of the superior tolerance of said component for ammonia, compared with silica-alumina, and because said component is more tolerant of ammonia than of organic nitrogen compounds, ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCK

While the process of the present invention can be practiced with utility when supplying to the hydrocracking zone, containing a catalyst comprising a layered clay-type crystalline aluminosilicate, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A LAYERED CLAY-TYPE CRYSTALLINE ALUMINOSILICATE COMPONENT, A HYDROGENATING COMPONENT SELECTED FROM PLATINUM AND COMPOUNDS THEREOF, PALLADIUM AND COMPOUNDS THEREOF, IRIDIUM AND COMPOUNDS THEREOF, RHODIUM AND COMPOUNDS THEREOF, AND RUTHENIUM AND COMPOUNDS THEREOF, AND A COMPONENT SELECTED FROM CHROMIUM AND COMPOUNDS THEREOF AND TUNGSTEN AND COMPOUNDS THEREOF

A. General

The layered clay-type crystalline aluminosilicate used in preparing the catalyst may be any catalytically active layered clay-type aluminosilicate, although the synthetic mineral, in dehydrated form, described above and in Granquist U.S. Pat. No. 3,252,757 is preferred. The hydrated mineral described in Granquist U.S. Pat. No. 3,252,757 may be used during combination of the various catalyst components; upon drying and calcination of the catalyst the mineral is converted to the dehydrated form. This component will be present in the catalyst in an amount of 10 to 99.9 weight percent, based on the total catalyst.

The chromium and/or tungsten hydrogenating component of the catalyst may be present in the final catalyst in the form of the metal, metal oxide, metal sulfide, or a combination thereof. This component may be combined with the layered clay-type crystalline aluminosilicate cracking component, or may be combined with other catalyst components in which said cracking component is dispersed, or both. In any case, the chromium and/or tungsten component will be present in an amount of 0.01 to 5.0 weight percent, based on said cracking component and calculated as the metal.

When a conventional crystalline zeolitic molecular sieve cracking component is included in the catalyst, said molecular sieve cracking component may be of any type that is known in the art as a useful component of a conventional hydrocracking catalyst comprising a Group VIII noble metal or noble metal-compound hydrogenating component. A decationized molecular sieve cracking component is preferred. Especially suitable are faujasite, particularly 'Y'-type and 'X'-type faujasite, and mordenite, in the ammonia form, hydrogen form, alkaline earth-exchanged form or rare earth-exchanged form.

The hydrogenating component of the catalyst that is selected from platinum, palladium, iridium, rhodium, ruthenium, and compounds of platinum, palladium, iridium, rhodium and ruthenium may be present in the final catalyst in the form of the metal, metal oxide, metal sulfide, or a combination thereof. This component may be combined with the layered clay-type crystalline aluminosilicate cracking component, or may be combined with other catalyst components in which said aluminosilicate cracking component is dispersed, or both. In any case, the component will be present in an amount of 0.01 to 2.0 weight percent, based on said aluminosilicate cracking component and calculated as the metal.

A preferred catalyst comprises a layered clay-type crystalline aluminosilicate cracking component intimately dispersed in a matrix of other catalytic components comprising alumina, silica-alumina, or silica-alumina-titania. The chromium or tungsten, or compound thereof, and the platinum, palladium, iridium, rhodium or ruthenium, or compound of platinum, palladium, iridium, rhodium or ruthenium, may be combined with said aluminosilicate cracking component before the latter is dispersed in the matrix, or the chromium or tungsten or compound thereof and the platinum, palladium, iridium, rhodium, ruthenium, or compound of platinum, palladium, iridium, rhodium or ruthenium may be a portion of the matrix. Examples of suitable matrices, in addition to matrices consisting of alumina or silica-alumina, include matrices comprising: (a) palladium or a compound thereof and chromium or a compound thereof and silica-alumina; (b) palladium or a compound thereof and chromium or a compound thereof and alumina; (c) palladium or a compound thereof and tungsten or a compound thereof and alumina; (d) palladium or a compound thereof and tungsten or a compound thereof and silica-alumina; (e) platinum or a compound thereof and chromium or a compound thereof and alumina; (f) platinum or a compound thereof and tungsten or a compound thereof and silica-alumina; (g) chromium or a compound thereof and iridium or a compound thereof and alumina or silica-alumina.

B. Method of Preparation

The layered clay-type crystalline aluminosilicate mineral cracking component of the catalyst may be prepared, in hydrated from, in the manner set forth in Granquist U.S. Pat. No. 3,252,757. This form of the mineral may be used to combine with the other catalyst components; during drying and calcining of the resulting composition to produce the final catalyst, said mineral is converted to the dehydrated form Alternatively, the mineral may be dehydrated and then impregnated with desired compounds.

In the case wherein chromium or tungsten or a compound thereof and platinum, palladium, iridium, ruthenium, rhodium or compound of platinum, palladium, iridium, ruthenium or rhodium are added directly to the layered clay-type crystalline aluminosilicate cracking component, impregnation using aqueous solutions of suitable hydrogenating metal compounds or adsorption of suitable hydrogenating metal compounds are operable methods of incorporating the hydrogenating component or compounds thereof into said aluminosilicate component. Ion exchange methods whereby the hydrogenating components are incorporated into said aluminosilicate component by exchanging those components with a metal component already present in said aluminosilicate component may be used. However, such methods require use of compounds wherein the metals to be introduced into said aluminosilicate component are present as cations.

In the case wherein said aluminosilicate cracking component first is dispersed in a matrix of other catalytic components and chromium or tungsten or a compound thereof and platinum, palladium, iridium, rhodium, ruthenium, or a compound of platinum, palladium, iridium, rhodium or ruthenium are introduced into the resulting composition, impregnation using an aqueous solution of suitable hydrogenating component compounds or adsorption of suitable hydrogenating component compounds are preferred methods.

The platinum, palladium, iridium, ruthenium or rhodium compound used in preparing the catalyst may be any convenient compound, for example platinum, palladium or iridium chloride, tetra ammino palladium nitrate, etc.

Where the layered clay-type crystalline aluminosilicate component, with or without added hydrogenating components is dispersed in a matrix of other catalyst components, the dispersion may be accomplished by cogelation of said other components around said aluminosilicate component in a conventional manner.

Following combination of the catalyst components, the resulting composition may be washed free of impurities and dried at a temperature in the range 500° to 1,200° F., preferably 900° to 1,150° F., for a reasonable time, for example 0.5 to 48 hours, preferably 0.5 to 20 hours.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding catalytic system wherein a noble metal component alone is present, with no chromium or tungsten being present.

SEPARATE HYDROFINING CATALYST

A. General

As previously indicated, advantageous results are obtained by providing in the reaction zone containing the hydrocracking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement less performed than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| % by weight of total catalyst, calculated as metal | | $SiO_2/Al_2O_3$ weight ratio |
| --- | --- | --- |

| | Ni | Mo | W | |
|---|---|---|---|---|
| 1. | 4–10 | 15–25 | | 10/90 to 30/70 |
| 2. | 6–15 | | 15–30 | 30/70 to 50/50 |

It has been found that use of said separate second catalyst increases the gasoline yield from the hydrocracking stage containing the catalyst of the present invention, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

B. Method of Preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantages over certain conventional hydrocracking catalysts. It has been found that use of said separate second catalyst in the above-described arrangements further increases the stability of the hydrocracking catalyst of the present invention, compared with the stability of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 400° to 950° F., preferably 500° to 850° F., a pressure in the range 800 to 3,500 p.s.i.g., preferably 1,000 to 3,000 p.s.i.g., and a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2,000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3,500 p.s.i.g., preferably 1,000 to 2,500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2,000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of the hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a layered clay-type crystalline aluminosilicate cracking component, 0.01 to 2.0 weight percent, based on said cracking component and calculated as the metal, of platinum, palladium iridium, ruthenium or rhodium, and 0.01 to 5.0 weight percent, based on said cracking component and calculated as the metal, of chromium or tungsten. As previously discussed, said layered aluminosilicate component may be dispersed in a matrix of other catalyst components, which matrix may contain all or a portion of the hydrogenating components. Also as previously discussed, a second separate catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4$¹fraction which is withdrawn through line 10, a $C_5$–180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Figure 2:
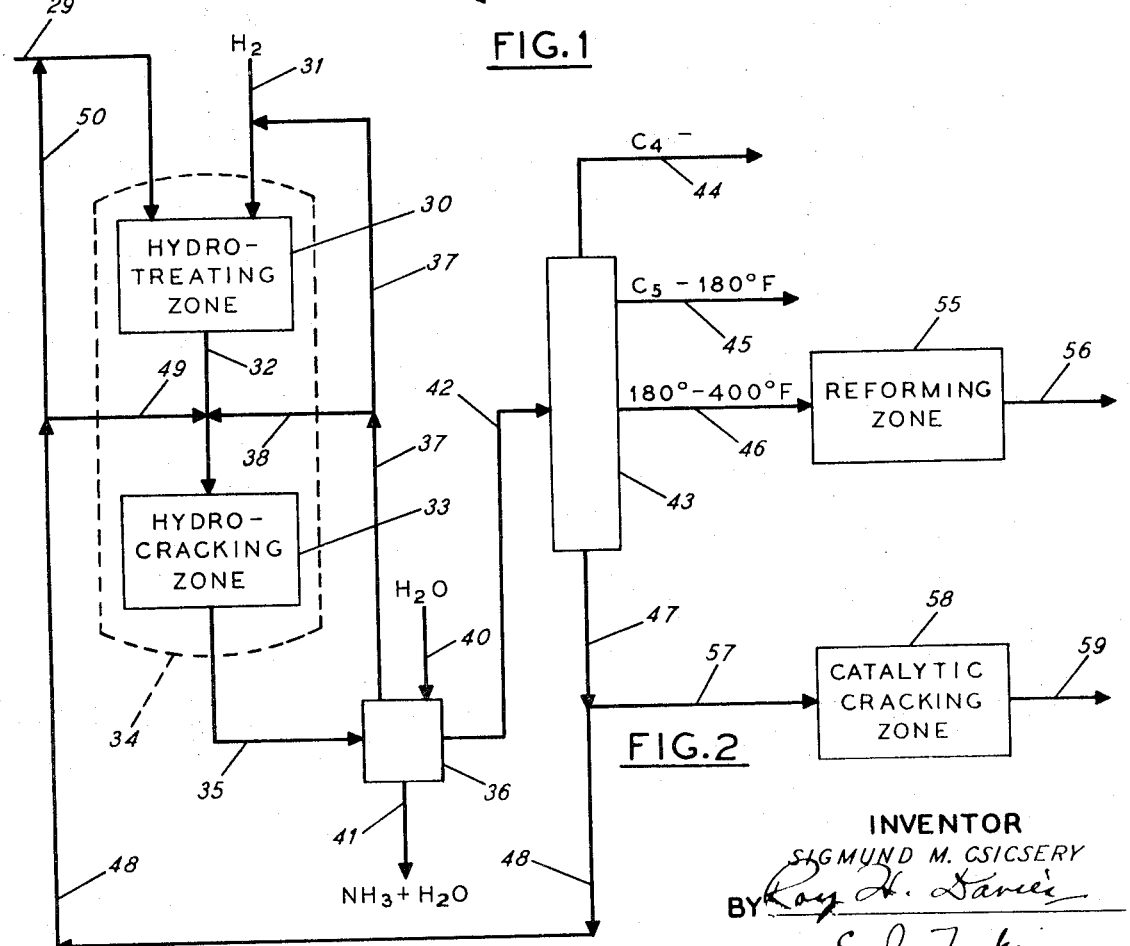
FIG. 2 is a diagrammatic illustration of apparatus and flow path suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst comprising a layered clay-type crystalline aluminosilicate cracking component and 0.01 to 2.0 weight percent, based on said hydrocracking component and calculated as the metal, of platinum, palladium, iridium, ruthenium or rhodium, and 0.01 to 5.0 weight percent, based on said cracking component and calculated as the metal, of chromium or tungsten. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown; condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4$¹fraction which is withdrawn through line 44, a $C_5$–180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400 F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are not intended in any way to limit the scope of the present invention.

EXAMPLE 1

A layered aluminosilicate-palladium catalyst (catalyst A, a catalyst in accordance with the present invention) is prepared in the following manner.

These starting materials are used:
1. 500 grams of a layered clay-type aluminosilicate in finely divided form.
2. 6.8 grams of tetra ammino palladium nitrate [Pd(NH$_3$)$_4$](NO$_3$)$_2$, dissolved in 700 ml. of H$_2$O.

The layered aluminosilicate in powder form is mixed with the tetra ammino palladium nitrate solution, to form a pasty mass. The pasty mass is dried in a vacuum oven for 6 hours at room temperature, then at 200°–250° F. for approximately 16 hours. The resulting dried material is crushed and impregnated with a solution of ammonium metatungstate (NH$_4$)$_2$W0$_{13}$·8H$_2$O, having a concentration sufficient to provide 0.5 wt. percent tungsten, calculated as the metal, in the final catalyst. The so-impregnated material is dried in the same manner as in the previous drying step.

The resulting material is tabletted, and then calcined in flowing dry air for 4 hours at 460° F., then for 4 hours at 900° F. The resulting catalyst upon analysis is found to contain 0.5 weight percent palladium, calculated as metal, and 0.5 weight percent tungsten, calculated as metal.

EXAMPLE 2

A catalyst (catalyst B, a catalyst in accordance with the present invention) is prepared exactly as in example 1, except that chromium chloride (CrCl$_2$) is used instead of ammonium metatungstate, and the catalyst is prepared by coimpregnation with the palladium compound and the chromium compound, rather than by successive impregnation. The final catalyst contains 0.5 weight percent palladium, calculated as metal, and 0.5 weight percent chromium, calculated as metal.

EXAMPLE 3

A catalyst (catalyst C, a comparison catalyst) is prepared exactly as in example 1, except that ammonium molybdate is used instead of ammonium metatungstate. The final catalyst contains 0.5 weight percent palladium, calculated as metal, and 0.5 weight percent molybdenum, calculated as metal.

EXAMPLE 4

The catalysts of the above examples are used to hydrocrack a portion of a light catalytic cycle oil feedstock of the following description:

| | |
|---|---|
| Gravity, °API | 29.7 |
| Aniline Point, °F. | 94.9 |
| Sulfur Content, p.p.m. | 0.3 |
| Nitrogen content, p.p.m. | 0.1 |
| PNA Analysis | |
| P | 9.9 vol.% |
| N | 52.6 vol.% |
| A | 37.5 vol.% |
| ASTM D-1160 Distillation | |
| ST/5 | 333/413 |
| 10/30 | 428/459 |
| 50 | 497 |
| 70/90 | 538/610 |
| 95/EP | 664/699 |

The hydrocracking is accomplished, on a once-through liquid basis, at a temperature of 520° F., a total pressure of 1,400 p.s.i.g., a liquid hourly space velocity of 2.0, and a hydrogen supply rate of approximately 12,000 s.c.f./bbl. The following results indicate the product gravity, in °API, as a measure of the relative activities of the three catalysts:

| | Activity, °API |
|---|---|
| Catalyst A (W) | 51 |
| Catalyst B (Cr) | 47 |
| Catalyst C (Mo) | 32 |

Of these catalysts, catalysts A and B are superior catalysts; their activities are surprising in view of the use of a Group VI component in each of the three catalysts and in view of the low activity of molybdenum-containing catalyst C.

CONCLUSIONS

Applicant does not intend to be bound by any theory for the unexpected superior activity and stability of the catalysts of the present invention. However, he assumes that the favorable results are largely attributable to: (1) a different, and more favorable, equilibrium at a given operating temperature for the system consisting of tungsten or chromium metal, the various tungsten or chromium oxides, the various tungsten or chromium sulfides, platinum, palladium, rhodium, ruthenium or iridium, the various oxides of platinum, palladium, rhodium, ruthenium or iridium, the various sulfides of platinum, palladium, rhodium, ruthenium or iridium, and sulfur and hydrogen, than for the system consisting of platinum metal, platinum oxide, platinum sulfide, sulfur and hydrogen, which provides a hydrocracking catalyst superior to the Rabo et al., noble-metal-containing catalyst; and (2) an interaction between the effects of chromium or tungsten or a chromium or tungsten compound and a layered clay-type crystalline aluminosilicate cracking component that produces more favorable hydrocracking results than are produced by any interaction between the effects of chromium or tungsten or a chromium or tungsten compound and a crystalline zeolitic molecular sieve or a gel-type silica-alumina cracking component.

What is claimed is:

1. A hydrocracking catalyst comprising a layered clay-type aluminosilicate cracking component, 0.01 to 2.0 weight percent, based on said cracking component and calculated as the metal, of a hydrogenating component selected from platinum and compounds thereof, palladium and compounds thereof, iridium and compounds thereof, ruthenium and compounds thereof and rhodium and compounds thereof, and 0.01 to 5.0 weight percent, based on said cracking component and calculated as the metal, of a hydrogenating component selected from tungsten and compounds of tungsten and chromium and compounds of chromium, said cracking component having, prior to drying and calcining of said catalyst, the empirical formula

where the layer lattices comprise said silica, said alumina, and said B, and where

- $n$ is from 2.4 to 3.0
- $m$ is from 0.2 to 0.6
- A is one equivalent of an exchangeable cation having a valence not greater than 2, and is external to the lattice,
- B is chosen from the group of negative ions which consists of $F^-, OH^-, \frac{1}{2}O^{--}$ and mixtures thereof, and is internal in the lattice, and
- $x$ is from 2.0 to 3.5 at 50 percent relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

2. A catalyst as in claim 1, which further comprises a matrix containing a component selected from alumina gel and silica-alumina gel.

3. A catalyst as in claim 2, wherein said layered clay-type crystalline aluminosilicate cracking component is in particulate form, and is dispersed through said matrix.

4. A catalyst as in claim 2, which further comprises Titania.

5. A catalyst as in claim 3, wherein said layered clay-type crystalline aluminosilicate cracking component is substantially in the ammonia or hydrogen form and is substantially free of any catalytic metal or metals, and wherein said hydrogenating components are contained in said matrix.

6. A catalyst as in claim 5, which further comprises titania.

7. A catalyst comprising:

A. A dehydrated layer-type, crystalline, claylike mineral cracking component which prior to dehydration has the empirical formula

where the layer lattices comprise said silica, said alumina, and said B, and where

- $n$ is from 2.4 to 3.0
- $m$ is from 0.2 to 0.6
- A is one equivalent of an exchangeable cation having a valence not greater than 2, and is external to the lattice,
- B is chosen from the group of negative ions which consists of $F^-, OH^-, \frac{1}{2}O^{--}$ and mixtures thereof, and is internal in the lattice, and
- $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and B. A hydrogenating component selected from platinum and compounds thereof, palladium and compounds thereof, rhodium and compounds thereof, ruthenium and compounds thereof, and iridium and compounds thereof, in an amount of 0.01 to 2.0 weight percent, based on said cracking component and calculated as metal, and a hydrogenating component selected from tungsten and compounds thereof and chromium and compounds selected from tungsten and compounds thereof and chromium and compounds thereof, in an amount of 0.01 to 5.0 weight percent, based on said cracking component and calculated as metal.

8. A catalyst as in claim 7, wherein said mineral is present in an amount of 10 to 99.9 weight percent, based on the total catalyst.

9. A catalyst as in claim 7, which further comprises a crystalline zeolitic molecular sieve component, in the amount of 1 to 50 weight percent, based on the total catalyst.

10. A catalyst as in claim 7, wherein A is chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$ and mixtures thereof.

11. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3,500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

12. A process as in claim 11, wherein said catalyst further comprises a component selected from the group consisting of alumina gel and silica-alumina gel.

13. A process as in claim 11, wherein said hydrocarbon feedstock contains 0.5 to 1,000 p.p.m. organic nitrogen.

14. A process as in claim 11, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

15. A process as in claim 14, wherein said separate second catalyst is located in said reaction zone in a bed disposed above said catalyst comprising a layered clay-type crystalline aluminosilicate cracking component.

16. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F. and a pressure in the range 800 to 3,500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

17. A process as in claim 16, wherein the effluent from said second bed of catalyst is separated into fractions, including a light gasoline fraction, a heavy gasoline fraction, and a fraction boiling generally higher than said heavy gasoline fraction.

18. A process as in claim 17, wherein said heavy gasoline fraction is catalytically reformed.

19. A process as in claim 17, wherein said fraction boiling generally higher than said heavy gasoline fraction is catalytically cracked.

* * * * *

PO-1050
(5/69)

UNITED STATES PATENT OFFICE
CERTIFICATE OF CORRECTION

Patent No. 3,617,490     Dated November 2, 1971

Inventor(s) SIGMUND M. CSICSERY

It is certified that error appears in the above-identified patent and that said Letters Patent are hereby corrected as shown below:

Title page, after "Chevron Research Company
San Francisco, Calif."

insert:

--The portion of the term of the patent subsequent to Oct. 20, 1987, has been disclaimed.--

Signed and sealed this 6th day of June 1972.

(SEAL)
Attest:

EDWARD M. FLETCHER, JR.        ROBERT GOTTSCHALK
Attesting Officer               Commissioner of Patents